(12) United States Patent  (10) Patent No.: US 7,657,886 B1
Chen et al.  (45) Date of Patent: Feb. 2, 2010

(54) MOBILE DEVICE WITH A MMU FOR FASTER FIRMWARE UPDATES IN A WIRELESS NETWORK

(75) Inventors: Shao-Chun Chen, Aliso Viejo, CA (US); James P. Gustafson, Irvine, CA (US); Toni Pakarinen, Ladera Ranch, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 11/144,537

(22) Filed: Jun. 3, 2005

Related U.S. Application Data

(60) Provisional application No. 60/577,347, filed on Jun. 3, 2004.

(51) Int. Cl.
*G06F 9/44* (2006.01)
*G06F 9/26* (2006.01)

(52) U.S. Cl. .................. 717/170; 717/169; 717/171; 717/172; 711/202; 711/221

(58) Field of Classification Search .................. None
See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,802,554 A * | 9/1998 | Caceres et al. ............... 711/103 |
| 5,878,256 A | 3/1999 | Bealkowski et al. | |
| 5,960,445 A | 9/1999 | Tamori et al. | |

(Continued)

FOREIGN PATENT DOCUMENTS

CA  2339923 A  3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Tuan Q Dam
*Assistant Examiner*—Zheng Wei

(57) ABSTRACT

A mobile electronic device with NOR and/or NAND flash memory may be updated using an update agent able to perform fault tolerant updates. The efficiency of an update of the memory of the device may be significantly improved by employing memory management information provided by a generator used to produce update information for updating the memory. Erasures and writes to blocks of flash memory may be reduced by mapping a logical block layout to a physical block layout that helps avoid moves of memory blocks to be updated. Fault tolerance of the update process is maintained.

16 Claims, 6 Drawing Sheets

U.S. PATENT DOCUMENTS

| | | | |
|---|---|---|---|
| 6,009,497 | A | 12/1999 | Wells et al. |
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 7,096,311 | B2 * | 8/2006 | Chiang ........................ 711/100 |
| 7,149,508 | B2 * | 12/2006 | Herle ........................... 455/418 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0182414 | A1 * | 9/2003 | O'Neill ........................ 709/223 |
| 2004/0107416 | A1 * | 6/2004 | Buban et al. ................. 717/170 |
| 2004/0133887 | A1 * | 7/2004 | Herle et al. .................. 717/171 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |
| WO | WO 0241147 A1 * | 5/2002 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE DEVICE WITH A MMU FOR FASTER FIRMWARE UPDATES IN A WIRELESS NETWORK

RELATED APPLICATIONS

The present application makes reference to, claims priority to, and claims benefit of U.S. Provisional Patent Application Ser. No. 60/577,347, entitled "MOBILE DEVICE WITH A MMU FOR FASTER FIRMWARE UPDATES IN A WIRELESS NETWORK", filed Jun. 3, 2004, the complete subject matter of which is hereby incorporated herein by reference, in its entirety.

The present application makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. Electronic devices, such as high-end mobile phones, often contain a flash memory card, sometimes called an MMC card. The electronic devices may contain a flash memory card reader that is employed to read information on the flash memory cards that are inserted by end users.

Quite often, flash memory cards are used to store content such as digital photographs or audio files by the end user.

If firmware or firmware components are to be changed, it is often very tricky to update the firmware components in an electronic device. The electronic device must have sufficient memory available to download an update package and to execute an update process. Changes to firmware or firmware components of the electronic device must be performed in a fault tolerant mode and fault tolerant code are not easy to implement.

Typically, attempts to upgrade firmware and/or software in electronic devices, such as GSM mobile phones, are often hampered by the long update times required to update flash in a fault tolerant mode. Typically two writes per block of updated code is necessary. In addition, various types of flash exist such as, for example, NAND and NOR flash memory. Addressing firmware updates across various types of flash memory devices is a big challenge and is currently not easily solved. In addition, some electronic devices may not have sufficient memory to store a large update package or to conduct updates. Some devices with an update agent are not capable of updating in a fault tolerant mode.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware and/or software update using an update agent in a mobile electronic device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of conducting device management tasks, such as updating software/firmware in electronic devices, and more specifically, to the use of a memory management unit (MMU) in an electronic device to conduct efficient fault tolerant firmware updates in the electronic device. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

Figure 1:
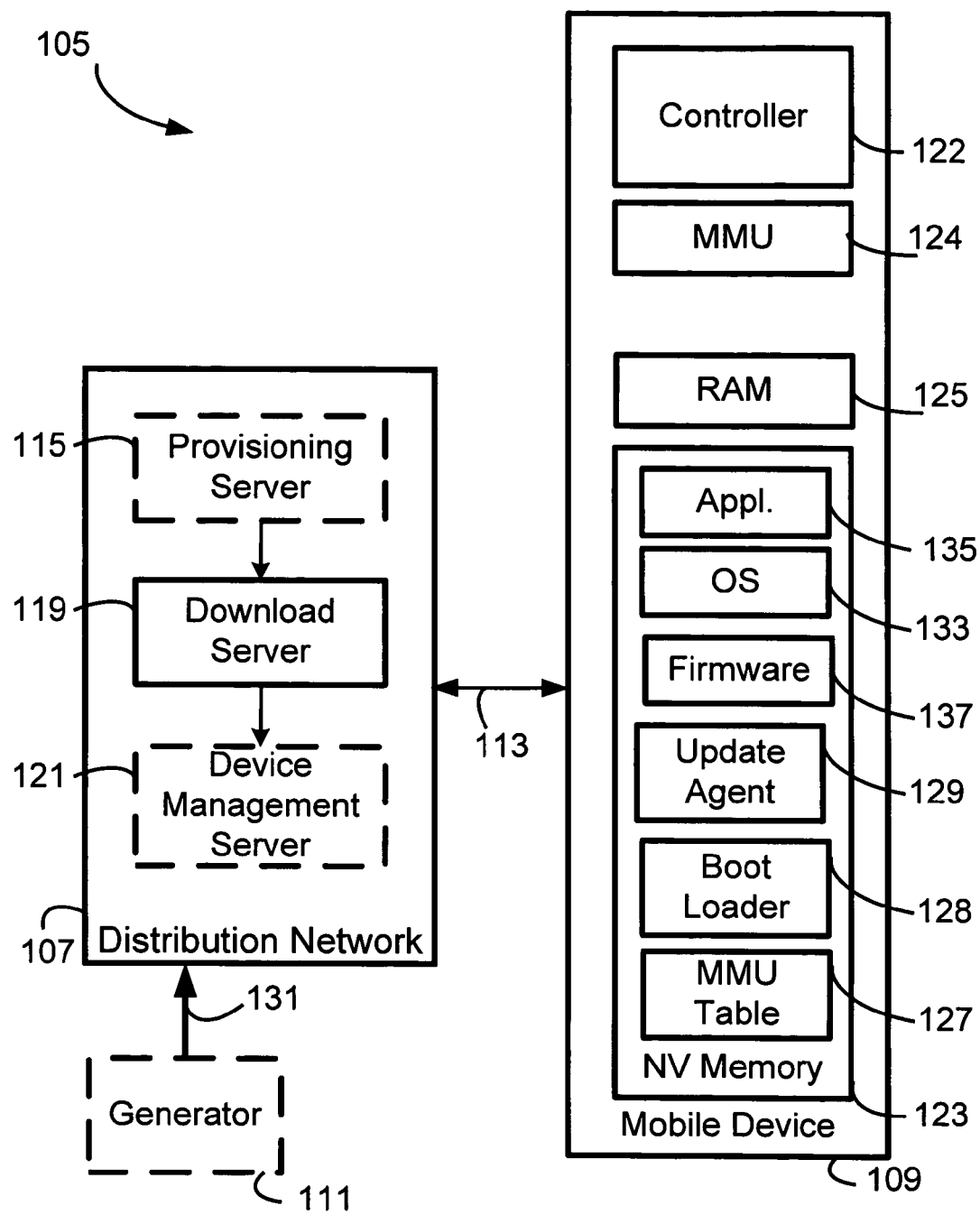
FIG. 1 is a perspective block diagram of an exemplary update network that comprises a mobile device having an MMU, a distribution network, and a generator, in accordance with a representative embodiment of the present invention.

FIG. 1 is a perspective block diagram of an exemplary update network 105 that comprises a mobile device 109 having an MMU 124, a distribution network 107, and a generator 111, in accordance with a representative embodiment of the present invention. The mobile device 109 shown in FIG. 1 comprises a controller 122, the MMU 124, random access memory (RAM) 125, and non-volatile memory 123. The RAM 125 and the non-volatile memory 123 may be updated using update information produced by the generator 111. The distribution network 107 may disseminate the update information in the form of update packages to update the mobile device 109, via a communication path 113, that may comprise, for example, a wired or wireless network such as a cellular network, a paging network, a public switched telephone network (PSTN), and the Internet, to name only a few. The generator 111 may generate the update information/update packages using a first binary code image (i.e., first code version) and a second binary code image (i.e., second code version). The generator 111 may communicate update information/update packages to the distribution network 107 via a communication path 131 that may comprise a wired or wireless network such as those listed above.

Typical fault tolerant updates require two flash memory writes and two flash memory erases per block of flash memory being updated. A representative embodiment of the present invention makes it possible to update the same blocks of flash memory employing only one flash erase and one flash write, thereby reducing the update time considerably.

A representative embodiment of the present invention may be employed not only with mobile devices such as those discussed above, but also with other types of electronic devices that comprise non-volatile memory with resident software that is updateable by an update agent in the electronic device.

As shown in the illustration of FIG. 1, the non-volatile memory 123 of the mobile device 109 comprises an update agent 129, a boot loader 128, firmware 137, an operating system (OS) 133, and applications 135. The non-volatile memory 123 may also comprise a memory management unit table (MMU table) 127 that may be employed with MMU 124 to efficiently conduct fault tolerant updates of firmware 137 and/or applications 135 in accordance with a representative embodiment of the present invention, employing one pass (1-N) flash write, with one write per block of flash memory.

In a representative embodiment of the present invention, a memory management unit (MMU) that is employed by some central processing units (CPUs) in electronic devices such as, for example, mobile handsets, may also be employed in the update of firmware and/or software that resides in non-volatile memory of the electronic devices. An MMU such as, for example, the MMU 124 may be used in an efficient way, to reduce update time to the time needed for one write per block, while also conducting the update in a fault-tolerant mode.

Existing fault tolerant updates may require two flash memory writes and two flash memory erases per block of flash memory to be updated. A representative embodiment of the present invention is able to perform the same update of memory using only one flash memory erase and one flash memory write per block of flash memory to be updated, thereby reducing the update time considerably.

In previous update approaches that were not based on the use of an MMU, every block (in some order) was shifted to a next block location during pre-processing, and shifted again to its previous block location during an update phase. This approach to update of memory is inefficient in that it involves two flash memory writes and two flash memory erases per block of memory that is updated.

It is a function of an MMU to translate logical or virtual memory references used by a controller/processor (e.g., a CPU) into physical memory addresses. Thus, an MMU may facilitate mapping between a user memory space used by a program to a physical memory address managed by an operating system or firmware. Thus, an MMU may be responsible for virtual or logical to physical address mapping. The MMU may be located between the controller/processor (e.g., a CPU) and a cache that operates on physical addresses. In one representative embodiment of the present invention, an MMU may, for example, employ page tables that are managed by a master MMU table. In another representative embodiment of the present invention, the MMU may, for example, employ inverted page tables.

In a representative embodiment of the present invention, an MMU table such as, for example, the MMU table 127 of FIG. 1 may contain several entries. In some representative embodiments of the present invention, there may be more than one MMU table. Each MMU table may be characterized by, for example, an ADDRVIRTUAL field that defines the base address in the logical or virtual memory space where the region of external physical memory will be mapped. Each MMU table may also be characterized by, for example, an ADDRPHYSICAL field that defines the physical base address in the logical or virtual memory space to be mapped into physical address space. In addition, each MMU table may be characterized by, for example, a SIZE field that defines the size of the region to be mapped. For example, the MMU may support 1 MB, 64 KB, 4 KB and 1 KB pages, and the SIZE field may indicate the page size that will be mapped. The MMU table may also comprise characteristics such as an ACCESS field that defines access permission(s) that firmware and/or software components may have to a region. For example, access permissions may comprise read-only and read/write. An MMU in accordance with a representative embodiment of the present invention may also comprise a PRESERVE field that defines whether an MMU entry will be preserved in the MMU table.

A representative embodiment of the present invention achieves improved update performance by employing a memory management unit (MMU) such as the MMU 124 of FIG. 1 to perform shift and update operations upon memory, at the same time. This may be achieved by means of an MMU table such as, for example, the MMU table 127 of FIG. 1, that is provided in an update information/update package created by a generator such as, for example, the generator 111 of FIG. 1. The update information/update package containing the MMU table may be used by an update agent such as the update agent 129 of FIG. 1, for example. As discussed above, a generator such as the generator 111 of FIG. 1 may be used in a representative embodiment of the present invention to extract difference information using two versions of software and/or firmware for the electronic device. In one embodiment of the present invention, such difference information may be communicated as a set of instructions that are executable by an update agent, to convert the first version of software and/or firmware to the second version, in the electronic device. The final execution layout in RAM such as, for example, the RAM 125 may be employed as an entry into an MMU table such as the MMU table 127, for example.

In a representative embodiment of the present invention, a generator such as the generator 111 of FIG. 1 may know the physical view of memory as well as a logical view of memory, and may enable creation of an MMU table that is sent to the electronic device (e.g., a mobile handset) for use during the update of memory in the electronic device.

Employment of a representative embodiment of the present invention results in a dramatic update time improvement for MMU environments. A representative embodiment of the present invention may realize a 50 percent reduction in update time. Prior fault tolerant update approaches may take two memory writes per block of memory to be updated, which is not as efficient as the methods described above with respect to a representative embodiment of the present invention. Use of an MMU mechanism as described above reduces the number of memory writes to one memory write per block of memory updated, and maintains fault tolerance. In some representative embodiments of the present invention, a hardware MMU may not be employed. For example, for NAND flash based devices, the MMU may not be used, and a loader that loads code from NAND flash memory into RAM may be employed to achieve the same results and efficiencies.

In a representative embodiment of the present invention, during an update of memory in an electronic device such as, for example, the mobile device 109 of FIG. 1, an MMU table such as the MMU table 127 may maintain a mapping between the virtual memory reference (or logical memory reference) of a software and/or firmware component (or symbol) and its physical address in non-volatile memory such as non-volatile memory 123, for example. In addition, an update of multiple blocks of the non-volatile memory 123 by an update agent such as the update agent 129, for example, may employ one or more free memory banks (sometimes referred to as "bubbles" or empty blocks). The free memory banks may be employed such that an update of designated blocks (e.g., according to some predefined order) may be conducted so that the contents of an "old" logical or virtual block is maintained (e.g., for fault tolerance purposes) until the successful update and flash memory write into a different physical block of memory is completed. Subsequent to the successful update of a block, the next logical block in the block order may be updated (e.g., in RAM) and written into a different (often subsequent) block adjacent to the previously updated block, and so on. In a representative embodiment of the present invention, an MMU table such as the MMU table 127 of FIG. 1 may provide information on how the updated blocks were shifted "physically", even while the "logical" relationship of the blocks is maintained.

In a representative embodiment of the present invention, an update agent such as the update agent 129 of FIG. 1 may be employed by an electronic device such as the mobile device 109 of FIG. 1 to update firmware and/or software resident in non-volatile (NV) memory such as the NV memory 123, for example. The update agent 129 may be described as being 'close-to the-metal', in that the update agent 129 may be cognizant of the specifics of the hardware circuitry of the electronic device (e.g., the mobile device 109). In one representative embodiment of the present invention, the update agent 129 may be part of the firmware 131 of the mobile device 109, and may be capable of updating the firmware 131 in a fault-tolerant mode using a bank-by-bank update process. The status of such an update activity in an electronic device may not be progressively stored in memory, but may instead be determined using pre-computed cyclic redundancy check (CRCs) values or digital signatures provided in an update package retrieved from the distribution network 107.

In one representative embodiment of the present invention, the logical to physical memory mapping represented in an MMU table such as the MMU table 127 of FIG. 1, for example, may involve the mapping of a logical address into a page directory, a page table, and page frame information.

In another representative embodiment of the present invention, an operating system (OS) such as the OS 133 may not employ an MMU that comes with a controller/CPU, and may not use an MMU table such as the MMU table 127. In such a representative embodiment of the present invention, non-volatile memory such as the non-volatile memory 123 may be a NOR-type flash memory. MMU table entries in an MMU table such as the MMU table 127 may be employed by an MMU like MMU 124, after the update process, in the computation of physical addresses from logical addresses, for example.

In one representative embodiment of the present invention, a generator such as the generator 111 may, for example, create update information (e.g., an update package) and may place within the update package MMU table information that an update agent such as the update agent 129 may employ.

In another representative embodiment of the present invention, a generator such as the generator 111 may create an update information (e.g., an update package), and may embed MMU table information into the new memory image to be updated by the update information (e.g., an update package). In such an arrangement, an update agent such as the update agent 129, for example, may be oblivious to the fact that part of the memory image being updated is MMU information, an MMU table, or a portion thereof.

In a representative embodiment of the present invention, a generator such as the generator 111 of FIG. 1 may create MMU information based upon, for example, shifts in software and/or firmware components, changes in the code of various software and/or firmware components, shifts that may be employed for enforcing fault tolerant updates, to name only a few items. The generator 111 may then incorporate MMU information into an MMU section of the new or second memory image, prior to generating difference information. In another representative embodiment of the present invention, the generator 111 may incorporate MMU information into an MMU section of the update information, after the generation of difference information.

In a representative embodiment of the present invention, an update agent such as, for example, the update agent 129 of FIG. 1 may not employ MMU information or MMU tables.

In a representative embodiment of the present invention, a boot loader such as, for example, the boot loader 127 of FIG. 1 may have knowledge of an MMU like the MMU 124 of FIG. 1, and may employ the updated MMU information in the mobile device 109.

Figure 2:
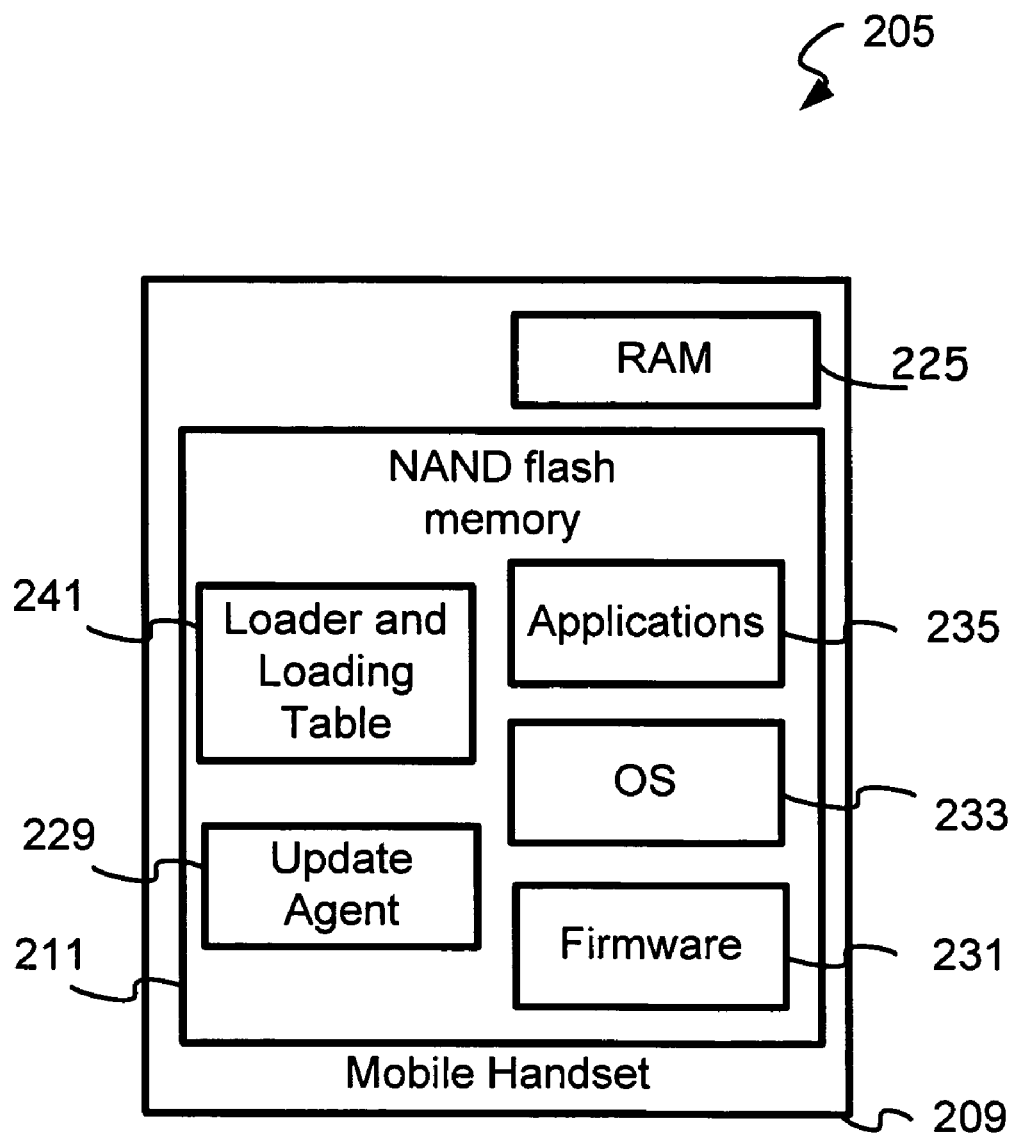
FIG. 2 is a perspective block diagram of a exemplary mobile handset with RAM and a NAND flash memory that comprises an update agent capable of updating software and/or firmware components resident in the NAND flash memory, in accordance with a representative embodiment of the present invention.

FIG. 2 is a perspective block diagram of a exemplary mobile handset 209 with RAM 225 and a NAND flash memory 211 that comprises an update agent 229 capable of updating software and/or firmware components resident in the NAND flash memory 211, in accordance with a representative embodiment of the present invention. As shown in FIG. 2, the NAND flash memory 211 comprises firmware 231, an operating system (OS) 233, and applications 235. The NAND flash memory 211 also comprises a loader 241 that may be employed to load firmware 231 components, OS 233, and/or applications 235 into the RAM 225 prior to execution. Such loading may involve the use of information on how logical addresses in the code from the NAND flash memory 211, for example, are to be mapped to physical addresses. In a representative embodiment of the present invention, such mapping may, for example, be changed or updated when firmware and/or software components are updated in the NAND flash memory 211. The loader 241 may be employed to load executable components from the NAND flash memory 211 into the RAM 225, using mapping information provided in MMU table information provided by a generator such as, for example, the generator 111 of FIG. 1. The mapping information may be employed for updating the mobile device 209, such that the components loaded into the RAM 225 are at the correct address employing the logical to physical address mapping provided by the MMU table information.

In a representative embodiment of the present invention, a loader such as the loader 241 of FIG. 2 may employ an MMU table, that may also be referred to as a "loading table", provided by a generator such as the generator 111 of FIG. 1, for example. The loader 241 may employ the MMU table along with update information (e.g., an update package), so as to load the firmware 231 and/or software components 233, 235 at the correct addresses in the RAM 225, after an update of firmware and/or software has been performed. Thus, the loader 241 and the loading table (i.e., MMU table) provided by the generator may both be updated by an update agent such as, for example, the update agent 229 during an update of firmware 231, OS 233, and/or applications 235.

Figure 3:
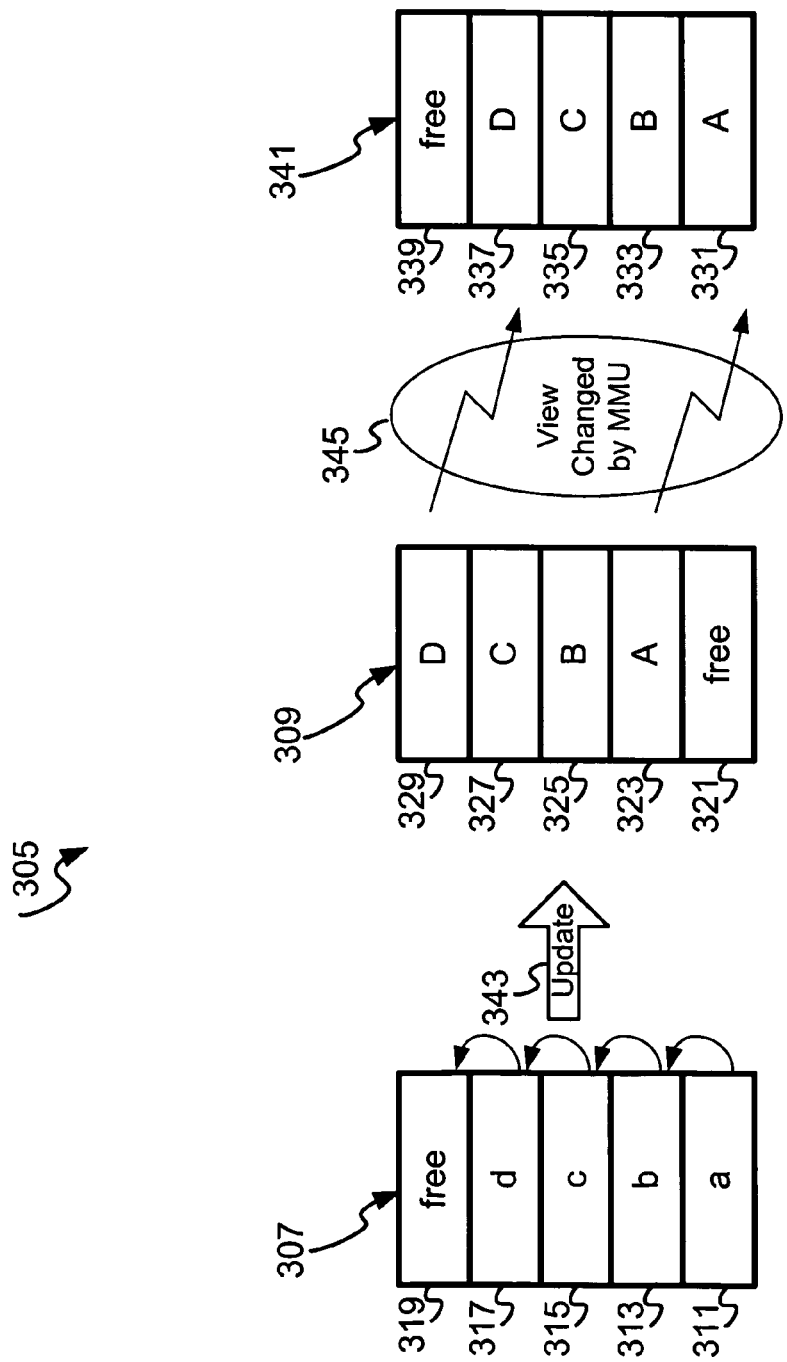
FIG. 3 is a perspective block diagram depicting an exemplary memory arrangement during an update process conducted by an update agent such as, for example, the update agent of FIG. 2 in an electronic device, in accordance with a representative embodiment of the present invention.

FIG. 3 is a perspective block diagram depicting an exemplary memory arrangement during an update process conducted by an update agent such as, for example, the update agent 229 of FIG. 2 in an electronic device, in accordance with a representative embodiment of the present invention. Employing a representative embodiment of the present invention, an update agent (e.g., the update agent 229) may update firmware and/or software of an electronic device such as the mobile handset 209 of FIG. 2 twice as fast as prior methods by using a memory controller such as, for example, a memory management unit (MMU) in the electronic device. An MMU in the electronic device may employ MMU information provided in update information (e.g., an update package) used to update software and/or firmware in the electronic device. The use of the memory controller (e.g., a hardware MMU) in remapping the physical layout of updated blocks of firmware (and/or software), while maintaining a logical mapping consistent with the execution image, makes the update process more efficient and reduces the update time by 50%. The improvement in efficiency over conventional approaches is due to the fact that conventional fault-tolerant update generally employ two memory writes per block of updated memory, while with the use of an MMU mechanism as practiced in a representative embodiment of the present invention reduces the number of memory writes per block updated to one write per block, while still maintaining fault-tolerance.

In a representative embodiment of the present invention, the update process may use a free block as the first block to be written with updated content. Thus, the initial block layout 307 for the memory image may include a free block 319 that is used during update 343 to create an updated block D 329 in updated block layout 309, from an original block d 317. Similarly, after updated block D 329 is created, the free block 319 may move to occupy original block 317, into which an original block c 315 may be updated and saved as the updated block C 327, and so on. Thus, starting with the initial block layout 307, an update agent such as, for example, the update agent 229 of FIG. 2 may create the updated block layout 309 during an update process, with a free block initially located at free block 319 finally ending up as the free block 321. Using a view change feature provided by a memory controller such as, for example, a hardware MMU in the electronic device, the updated block layout 309 may be viewed and accessed as the memory block layout 341.

Thus, a representative embodiment of the present invention may employ an MMU in an electronic device (e.g., sometimes provided as part of a chipset) and MMU information provided by a generator along with update information (e.g., an update package), such that an initial block layout 307 is modified or changed by the MMU after an update process to achieve a view that it is effectively experienced as the memory block layout 341.

In the illustration of FIG. 3, the arrow representing update 343 includes a physical flash programming of memory, while the view change 345 by an MMU such as, for example, the MMU 124 of FIG. 1 represents an MMU table update which changes the view of the memory layout by the controller/processor of the electronic device.

In a representative embodiment of the present invention, the update 343 shown in the illustration of FIG. 3 may be performed by an update agent in an electronic device such as, for example, the update agent 229 of the mobile handset 209, of FIG. 2, resulting in the updated block layout 309, while the operation of an MMU such as the MMU 124 of FIG. 1 projects the updated block layout 309 onto the address space of a controller/processor (e.g., controller 122 of FIG. 1) in the electronic device, as memory layout 341.

Aspects of the present invention as shown in FIG. 3 may also apply to NAND flash-based electronic devices that do not comprise an MMU. However, an update agent in these NAND based devices may employ a memory control mechanism that loads firmware and/or software into RAM in blocks, to update the firmware and/or software blocks as indicated by the update process 343.

Figure 4:
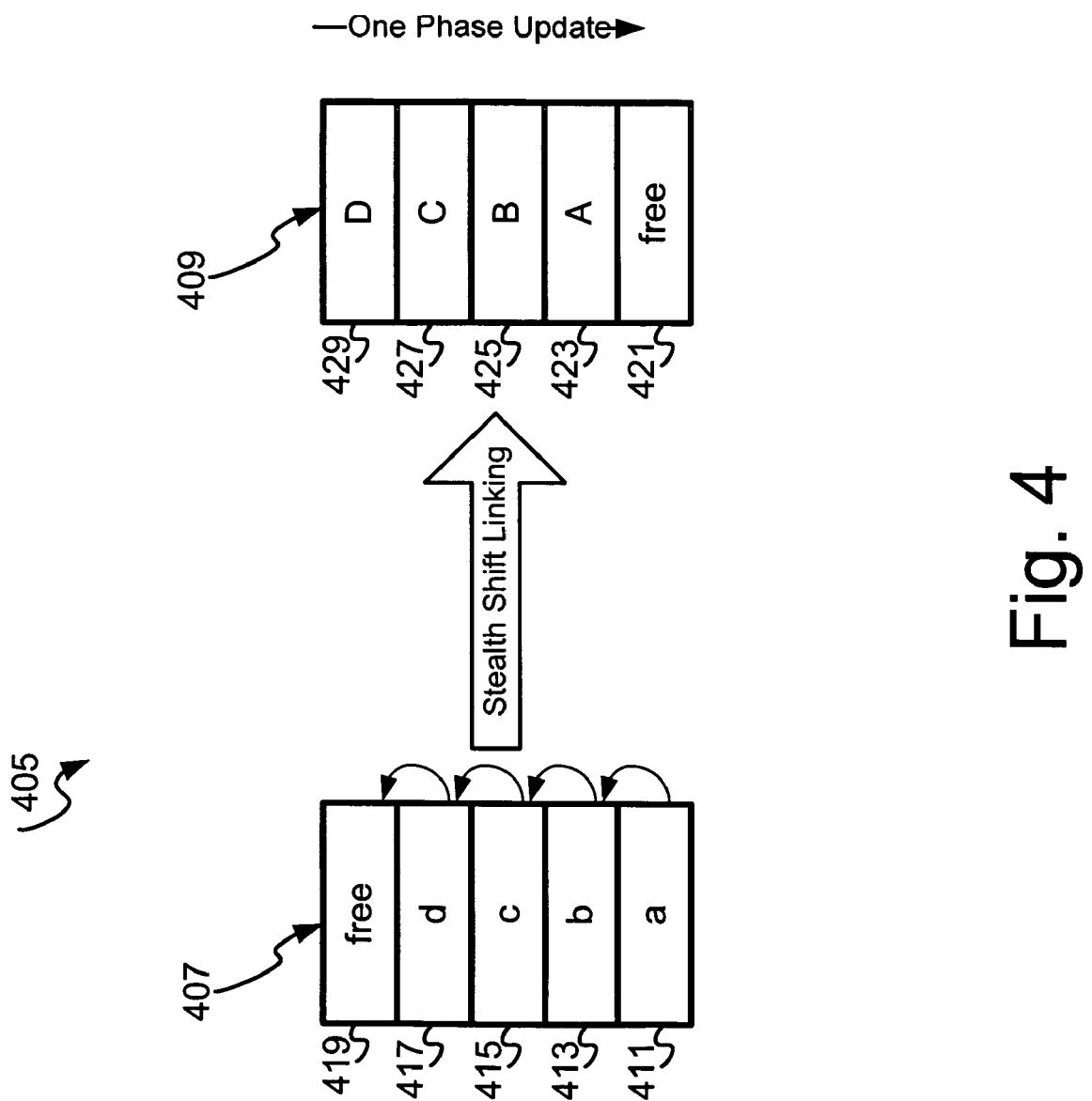
FIG. 4 is a perspective block diagram showing an exemplary transition in the memory image layout of non-volatile memory of an electronic device such as, for example, the non-volatile memory of mobile handset of FIG. 1, in which an update process starts with an initial memory layout and finishes with the memory layout, in accordance with a representative embodiment of the present invention.

FIG. 4 is a perspective block diagram showing an exemplary transition in the memory image layout of non-volatile memory of an electronic device such as, for example, the non-volatile memory 123 of mobile handset 109 of FIG. 1, in which an update process starts with an initial memory layout 407 and finishes with the memory layout 409, in accordance with a representative embodiment of the present invention. In a representative embodiment of the present invention, a generator such as, for example, the generator 111 of FIG. 1 may create update information (e.g., an update package) that uses a stealth shift linking activity. The created update information (e.g., an update package) may be consumed by an update agent such as the update agent 129 of FIG. 1 or 229 of FIG. 2, for example. Using such an approach, a new memory image may be targeted to contain a free memory block at the beginning or the end of the resulting memory layout space, for example, so as to allow the update process to complete in one single update phase.

In such a representative embodiment of the present invention, a hardware MMU may not be employed. A generator such as the generator 111 of FIG. 1, for example, may analyze two versions (i.e., memory images) of firmware and/or software (e.g., a first or old version and a second or updated/new version) to generate difference information that may be assembled into an update package. The generator 111 may employ a "prediction-on-the-fly" mechanism to create a new target memory image that facilitates a one-phase update process from the old or first version. The generator 111 may re-link the firmware/software components in the updated/new memory image of firmware, employing prediction techniques, such that the target build for the newer version of the firmware image incorporates the free memory block at the appropriate location, as shown in the memory layout 409. In a representative embodiment of the present invention, the free memory block may, for example, be positioned at either the beginning or the end of the memory space.

By employing a representative embodiment of the present invention, update information (e.g., an update package) usable by an electronic device to achieve the updated block layout 409, starting with the initial memory image block layout 407 may thus be created by a generator such as the generator 111 of FIG. 1, for example. An update agent in an electronic device such as, for example, the update agent 129 in mobile device 109 or update agent 229 in mobile handset 209 may then be able to perform an update of memory in a single phase. In addition, the update time is guaranteed to be no greater than 1×N, where N is the time consumed for erasing/updating a single block of non-volatile memory. An update agent in accordance with a representative embodiment of the present invention may create the memory block layout 409 from an initial memory block layout 407 employing an update process that uses only a single update phase.

In a representative embodiment of the present invention, a stealth engine tool used by a generator such as the generator 111 of FIG. 1, for example, may automatically analyze and acquire build information for each version of firmware and/or software. The build information may provide detailed insight into all changes between two versions of code under consideration for a update transition. Using the build information, the stealth engine tool may provide near-perfect optimization of generated update information (e.g., an update package), while incorporating a free block at an appropriate location in a new/updated memory image. A linker tool may be employed in this mechanism to map firmware and/or software components at the correct memory locations in order to achieve the final block layout necessary in the new/updated memory image. Thus, the firmware and/or software components are naturally shifted by the linker tool that generates the new/updated memory image.

Figure 5:
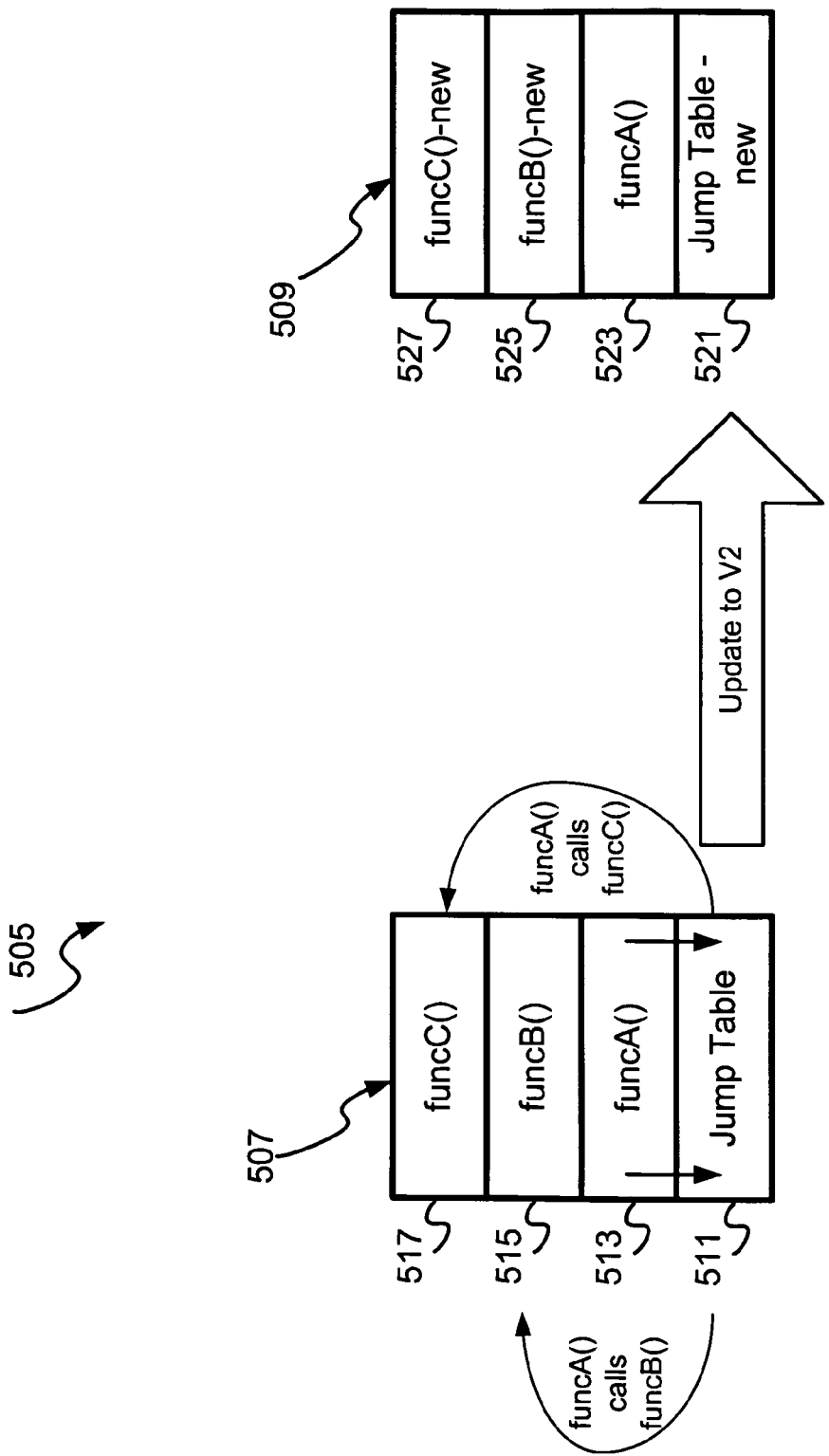
FIG. 5 is a perspective block diagram showing an exemplary transition in the memory image block layout of non-volatile memory of an electronic device such as, for example, the mobile handset of FIG. 2, during an update process from an initial block layout to an update block layout in which a transparent branch link redirection mechanism using a jump table is employed, in accordance with a representative embodiment of the present invention.

FIG. 5 is a perspective block diagram showing an exemplary transition in the memory image block layout of non-volatile memory of an electronic device such as, for example, the mobile handset 209 of FIG. 2, during an update process from an initial block layout 507 to an update block layout 509 in which a transparent branch link redirection mechanism using a jump table 511 is employed, in accordance with a representative embodiment of the present invention. The initial block layout 507 may comprise functions funcC 517, funcB 515 and funcA 513. The updated block layout 509 may comprise updated functions funcC-new 527, funcB-new 525, an updated/new jump table 521, and a function funcA 523 that is unchanged from the initial block layout. In this approach, all function calls may be redirected through a jump table 511 that may be modified during the update operation to a new jump table 521. In one representative embodiment of the present invention, the jump tables 511, 521 may be fixed at predetermined location(s). By employing a representative embodiment of the present invention, an avalanche effect between the functions, that may typically be experienced when one function that is a set of functions is updated, may be avoided. For example, in FIG. 5, funcA 513 calls both funcB 515 and funcC 517. In the illustration of FIG. 5, funcA 513 is not changed, and there is no reason to update it. A special firmware/software development tool may be used to organize the redirections, and to build the jump table. Such a special tool may be contained within a generator such as the generator 111 of FIG. 1, for example. The jump table may be embedded in the firmware and/or software. Update information (e.g., update packages) used to update firmware and/or software may also provide changes to the jump table to create a new jump table that corresponds to the newer version of firmware and/or software.

Figure 6:
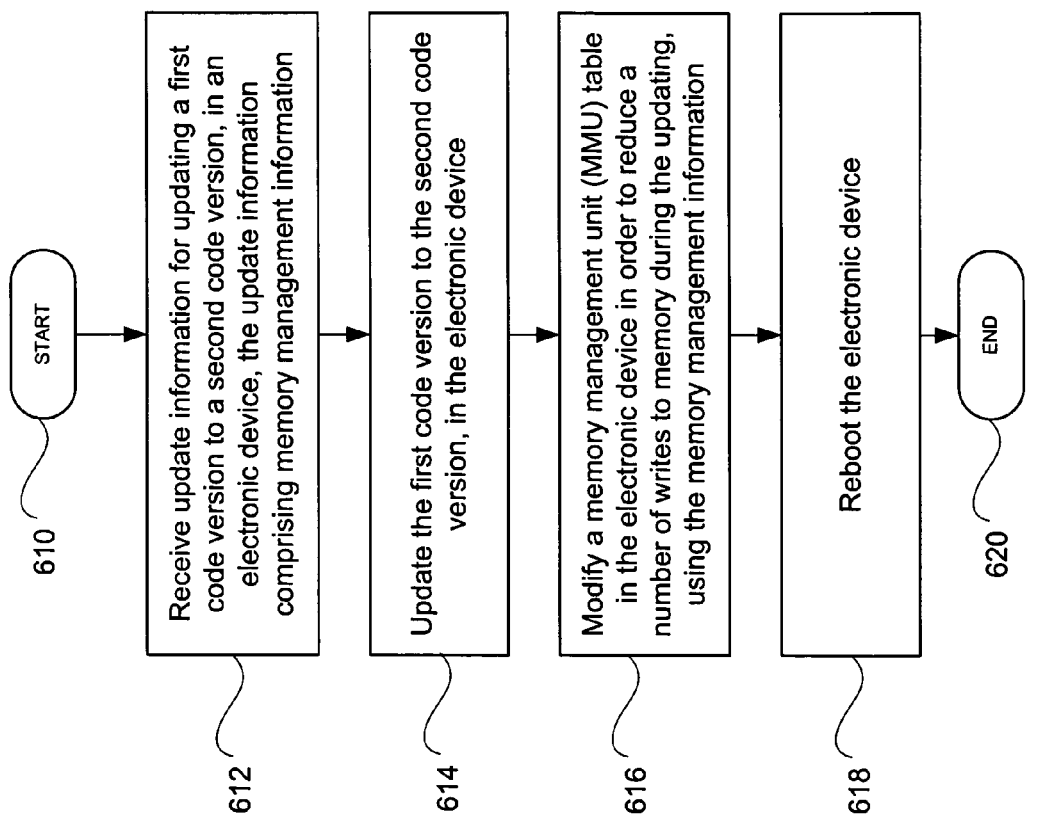
FIG. 6 shows a flowchart illustrating an exemplary method of performing faster updating of firmware and/or software in an electronic device having a memory management unit, in accordance with a representative embodiment of the present invention.

FIG. 6 shows a flowchart illustrating an exemplary method of performing faster updating of firmware and/or software in an electronic device having a memory management unit, in accordance with a representative embodiment of the present invention. The method illustrated in FIG. 6 begins at some point after the power-up of an electronic device such as, for example, the mobile device 109 of FIG. 1. The electronic device may receive update information for updating a first code version to a second code version in the electronic device (block 612). The received update information may comprise memory management information for use by a memory management unit such as the MMU 124 of FIG. 1, for example. Such update information and memory management information may, for example, be created by a generator such as the generator 111 of FIG. 1, from a first version of code and a second version of code for the electronic device. The update information and memory management information may be arranged to cause a free block of memory to be located within the memory of the electronic device. The free block of memory may be positioned within the memory of the electronic device and the memory management information may be suitably arranged so as to enable more efficient update of code in the electronic device.

Next, the electronic device may update the first version of code to the second version of code, in the electronic device, using the update information (block 614). The update may be performed by update agent code such as the update agent 129 shown in the non-volatile memory 123 of FIG. 1, for example. The update of the first code version to the second code version may, for example, comprise the update agent code converting the first code version to the second code version using a set of executable instructions contained in the update information. The executable instructions may be produced by the generator 111 from difference information derived from the first code version and the second code version.

Following completion of the update, the electronic device may modify a memory management unit (MMU) table in the electronic device in order to reduce a number of writes to memory during the updating, using the memory management information (block 616). The memory management unit (MMU) may, for example, map logical memory references to corresponding physical memory addresses in the non-volatile memory of the mobile electronic device, in order to arrange the updated memory to be consistent with the second code version. The electronic device may then be rebooted (block 618).

Aspects of the present invention may be found in a generator capable of generating an update package for a mobile electronic device by processing a first binary code version and a second binary code version. Such a generator may comprise a server comprising machine-readable storage, and predictor software resident in the machine-readable storage. The predictor software may be executable to cause the server to perform on-the-fly prediction of at least one shift of code components in the second binary code version with respect to the first binary code version. The predictor software may generate code shift information, and the generator may produce difference information based on the first binary code version, the second binary code version, and the code shift information. The generator may produce memory mapping information for use during an update of the first binary code version to the second binary code version, in the mobile electronic device. The memory mapping information may comprise a mapping between physical memory addresses and logical memory references associated with code components in the second binary code version. The generator may package the difference information and the memory mapping information into an update package for use by the mobile electronic device in updating the first binary code version to the second binary code version.

In a representative embodiment of the present invention, the update package may comprise a set of executable instructions for converting the first binary code version to the second binary code version. A representative embodiment of the present invention may also comprise analysis software executable by the server for automatically acquiring first build information for the first binary code version and second build information for the second binary code version. The analysis software may process the first build information and the second build information to gather delta information for changes in code between the first binary code version and the second binary code version, and may optimize the size of an update package based upon on the delta information.

Other aspects of the present invention may be seen in a mobile electronic device having a memory management unit (MMU). The mobile electronic device may be capable of updating at least one of the following: firmware and software in memory of the mobile electronic device, using resident update agent code. The mobile electronic device may comprise a controller capable of accessing machine-readable storage containing the update agent code, and update information comprising memory mapping information. The update agent code may update a first code version to a second code version, using the update information, and may provide memory mapping information to a memory management unit (MMU) following an updating activity. In addition, the memory management unit (MMU) may employ the memory management information to conduct normal operation of the mobile electronic device.

The memory mapping information may comprise a mapping of logical memory references to corresponding physical memory addresses in non-volatile memory of the mobile electronic device, for a plurality of code components. The memory mapping information may map logical memory references to corresponding physical memory addresses for only those of the plurality of code components having different physical memory addresses in the first code version and the second code version. The memory mapping information may comprise a memory management unit (MMU) update table that maps the logical memory references to corresponding physical memory addresses for only those of the plurality of firmware components having different physical memory addresses in the first code version and the second code version. The update agent may incorporate the memory management unit (MMU) update table into an updatable master memory management unit (MMU) table associated with the memory management unit (MMU) in the mobile electronic device.

In a representative embodiment of the present invention, the mobile electronic device may also comprise a master memory management unit (MMU) table used and maintained by the mobile electronic device. The memory mapping information provided by the update agent to the memory management unit (MMU) may comprise a replacement memory management unit (MMU) table that in turn comprises a mapping of logical memory references to corresponding physical memory addresses for a plurality of code components. The update agent code may replace the master memory management unit (MMU) table with the replacement memory management unit (MMU) table after updating, using the update information. The update agent code may replace at least a portion of the master memory management unit (MMU) table with the replacement memory management unit (MMU) table after updating, using the update information. The update information may comprise an update package.

Additional aspects of the present invention may be observed in a method of upgrading an electronic device comprising update agent code. Such a method may comprise receiving update information for updating a first code version to a second code version in the electronic device. The update information may comprise memory management information. A representative embodiment of the present invention may also comprise updating the first code version to the second code version, in the electronic device. In addition, the method may comprise modifying a memory management unit (MMU) table in the electronic device in order to reduce a number of writes to memory during the updating, using the memory management information, and rebooting the electronic device. Other representative embodiments of the present invention may comprise generating update information based upon the first code version and the second code version, and communicating the update information to the electronic device.

Memory management information in a representative embodiment in accordance with the present invention may comprise a mapping of logical memory references to corresponding physical memory addresses. Update information may comprise a set of executable instructions for converting the first code version to the second code version, and update information may comprise an update package. Memory management information may comprise replacement information for at least a portion of the contents of the memory management unit (MMU) table. Updating the first code version to the second code version may comprise a single pass update, and the single pass update may comprise a single write operation per updated memory location.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A generator capable of generating an update package for a mobile electronic device by processing a first binary code version and a second binary code version, the generator comprising:
    a server comprising machine-readable storage;
    predictor software resident in the machine-readable storage, the predictor software executable to cause the server to perform on-the-fly prediction of at least one shift of code components in the second binary code version with respect to the first binary code version;
    wherein the predictor software generates code shift information;
    wherein the generator produces difference information based on the first binary code version, the second binary code version, and the generated code shift information;
    wherein the produced difference information is used by a set of executable instructions in the update package to converting the first binary code version to the second binary code version; and
    wherein the generator produces memory mapping information which comprises a mapping between physical memory addresses and logical memory references associated with code components in the second binary code version for use during an update of the first binary code version to the second binary code version, in non-volatile memory of the mobile electronic device.

2. The generator of claim 1 wherein the generator packages the difference information and the memory mapping information into an update package for use by the mobile electronic device in updating the first binary code version to the second binary code version.

3. The generator of claim 1, further comprising:
    analysis software executable by the server for automatically acquiring first build information for the first binary code version and second build information for the second binary code version;
    wherein the analysis software processes the first build information and the second build information to gather delta information for changes in code between the first binary code version and the second binary code version; and
    wherein the analysis software optimizes the size of an update package based upon on the delta information.

4. A mobile electronic device having a memory management unit (MMU), the mobile electronic device capable of updating at least one of the following: firmware and software in memory of the mobile electronic device, using resident update agent code, the mobile electronic device comprising:
    a controller capable of accessing machine-readable storage containing the update agent code;
    update information comprising memory mapping information;
    wherein the memory mapping information comprises a mapping of logical memory references to corresponding physical memory address for only those of a plurality of code components having different physical memory addressed in the first code version and second code version;
    wherein the update agent code updates a first code version to a second code version, using the update information;
    wherein the update agent code provides memory mapping information to a memory management unit (MMU) following an updating activity; and
    wherein the memory management unit (MMU) employs the memory mapping information to conduct normal operation of the mobile electronic device.

5. The mobile electronic device of claim 4 wherein the memory mapping information comprises the mapping of logical memory references to corresponding physical memory addressed in non-volatile memory of the mobile electronic device, for the plurality of code components.

6. The mobile electronic device of claim 5 wherein the memory mapping information comprises a memory management unit (MMU) update table that maps the logical memory references to corresponding physical memory addresses for only those of the plurality of firmware components having different physical memory addresses in the first code version and the second code version, and wherein the update agent incorporates the memory management unit (MMU) update table into an updatable master memory management unit (MMU) table associated with the memory management unit (MMU) in the mobile electronic device.

7. The mobile electronic device of claim 4, further comprising:
    a master memory management unit (MMU) table used and maintained by the mobile electronic device;
    wherein the memory management information provided by the update agent to the memory management unit (MMU) comprises a replacement memory management unit (MMU) table that in turn comprises a mapping of logical memory references to corresponding physical memory addresses for a plurality of code components; and
    wherein the update agent code replaces the master memory management unit (MMU) table with the replacement memory management unit (MMU) table after updating, using the update information.

8. The mobile electronic device of claim 7 wherein the update agent code replaces at least a portion of the master memory management unit (MMU) table with the replacement memory management unit (MMU) table after updating, using the update information.

9. The mobile electronic device of claim 4 wherein the update information comprises an update package.

10. A method of upgrading an electronic device comprising update agent code, the method comprising:
    receiving update information for updating a first code version to a second code version in the electronic device, the update information comprising memory management information;

wherein the memory management information comprises replacement information for at least a portion of contents of a memory management unit (MMU) table in the electronic device;

updating the first code version to the second code version, in the electronic device according to the received update information;

modifying the memory management unit (MMU) table in the electronic device in order to reduce a number of writes to non-volatile memory during the updating, using the memory management information; and rebooting the electronic device.

11. The method of claim 10, further comprising:

generating update information based upon the first code version and the second code version; and communicating the update information to the electronic device.

12. The method of claim 10 wherein memory management information comprises a mapping of logical memory references to corresponding physical memory addresses.

13. The method of claim 10 wherein update information comprises a set of executable instructions for converting the first code version to the second code version.

14. The method of claim 10 wherein update information comprises an update package.

15. The method of claim 10 wherein updating the first code version to the second code version comprises a single pass update.

16. The method of claim 15 wherein the single pass update comprises a single write operation per updated memory location.

* * * * *